Patented July 2, 1940

2,206,280

UNITED STATES PATENT OFFICE 2,206,280

MANUFACTURE OF LUMINESCENT MATERIALS

Herman C. Froelich, Cleveland, Ohio, assignor to The Harshaw Chemical Company, Elyria, Ohio, a corporation of Ohio No Drawing. Application January 20, 1940, Serial No. 314,797

16 Claims. (Cl. 250—81)

This invention relates to luminescent materials, particularly luminescent silicates, and has for its principal object the production of luminescent silicates of improved afterglow. Strong afterglow is desirable for bridging over variable or intermittent states of excitation so as to give an even illumination, reference being had to use in electric discharge tubes.

This application is a continuation-in-part of my co-pending application Serial No. 227,987, filed September 1, 1938.

Broadly stated, my invention comprises the discovery that luminescent silicates of improved afterglow are provided by the incorporation therein of a suitable small quantity of arsenic. I have found that my discovery applies to luminescent silicates generally, and is of outstanding value in the cases of zinc silicates, cadmium silicates, beryllium silicates, zinc-beryllium silicates and zinc-magnesium-beryllium silicates.

In accordance with the invention, I prepare luminescent silicates of improved afterglow by firing together, in an oxidizing atmosphere or under equivalent oxidizing conditions, the following:

(1) Silica, preferably prepared as herein described, (2) A suitable metal oxide or mixture of metal oxides capable of forming luminescent silicates or compounds of such metals capable of yielding the oxides upon calcination, preferably one of the following, which I have found to give superior results:

(a) Zinc oxide or zinc oxide yielding material such as the nitrate or carbonate.

(b) Cadmium oxide or cadmium oxide yielding material such as the carbonate or the nitrate. Magnesium may be substituted for a portion of the cadmium.

(c) Zinc oxide mixed with beryllium oxide or the oxide of either zinc or beryllium mixed with the silicate of the other. Suitable oxide yielding compounds such as the nitrate or carbonate may be substituted for the oxide. A portion of the beryllium may be replaced by magnesium as oxide or suitable magnesium compound, such as the nitrate or carbonate, capable of yielding the oxide.

(3) An activator, preferably manganese as oxide yielding compound such as the nitrate.

(4) An oxide of arsenic or material capable of yielding the same upon calcination, preferably $As_2O_3$.

In addition to these four ingredients, each of which, or its equivalent, is material to the practice of the invention, other ingredients may be used for special purposes as will be obvious to persons skilled in the art.

Silica derived from suitably prepared ammonium silicofluoride or suitably prepared fluosilicic acid is unusually well suited to the production of these luminescent silicate materials.

I prefer to use, as a starting material for preparation of such silica, sodium-silicofluoride which usually will contain small amounts of arsenic, iron, lead and sometimes other heavy metals. The iron, and other impurities as well, should for duplicability of results be almost entirely removed, while the arsenic should be present in critical quantity if a strong afterglow is desired. If it should be desired to reduce the afterglow to a minimum, the arsenic content should be very low (e. g. less than .0001%). I prefer to remove the arsenic and add the critical amount at the proper stage.

In accordance with the preferred practice of the invention, sodium silicofluoride is reacted with an excess of concentrated sulfuric acid in the presence of sand or like siliceous material at a temperature of the order of 150° C. in a suitable still. The sulfuric acid used is of such strength and used in such quantity as to bind the water in the reaction chamber and prevent the formation of hydrofluosilicic acid. The sand reacts with the hydrofluoric acid generated so that the only volatile product is silicon tetrafluoride. Non-volatile impurities are left in the still. Volatile impurities can be removed later in the calcination step.

The silicon tetrafluoride is now run into aqueous hydrofluoric acid, which, having been made from distilled anhydrous acid and distilled water, carries only volatile impurities, removable in the calcination step. This results in the formation of hydrofluosilicic acid of high purity, which is then converted by ammonia into ammonium fluoride, silica and water. The ammonia may be gaseous or ammonium hydroxide made by absorbing ammonia gas in distilled water.

Silica is precipitated in a physical state which I have found to be much more suitable for the formation of a luminescent silicate composition than silica obtained from the decomposition of sodium silicate or any other process for production of pure silica of which I am aware.

This precipitate is non-gelatinous, filters easily and, when dried, forms a cake which is readily ground to an extremely finely divided powder.

Under the microscope, the powder, dispersed in quinoline, appears opaque, whereas a silica in the form of a ground, dried gel appears transparent. Previously known methods of making silica do not, so far as I am aware, give, at the same time, high purity and a physical state most desirable for the production of luminescent materials.

As indicated above, this precipitate may contain volatile impurities which, I have found may, according to choice, be expelled by heating to incipient red heat (about 500° C.) or be left in the material to be expelled on the final calcination in the production of the luminescent materials. It will be noted that the final solution from which the silica is precipitated contains only $NH_4F$ in solution. Accordingly, no nonvolatile impurity is present because of incomplete separation of the products.

Other silicofluorides which yield $SiF_4$ may be used as source materials instead of $Na_2SiF_6$. Ordinary commercial $(NH_4)_2SiF_6$ cannot be used in the final reaction unless it is first specially treated to remove non-volatile impurities. This may be done by a process as follows:

(a) A saturated aqueous solution of $(NH_4)_2SiF_6$ is acidified with $H_2SiF_6$ solution sufficient to produce 5% free acid. The amount is not critical.

(b) The solution is treated with $H_2S$, filtered and excess $H_2S$ blown out with air.

(c) The filtrate is nearly neutralized with $NH_4OH$, treated with $H_2S$, filtered and the excess $H_2S$ blown out with air.

(d) The filtrate is treated with an oxidizing agent such as $H_2O_2$, cooled below 10° C. and treated with ammonium nitroso phenyl hydroxylamine (Cupferron) and filtered. The resulting $(NH_4)_2SiF_6$ can be used in the final reaction and gives a silica of the required purity and in the desirable physical state.

Fluosilicic acid of suitable purity is suitable as a source of silica. Silica can be precipitated therefrom by the use of ammonia.

Following are specific examples of silica preparation:

Example I 760 grams of $Na_2SiF_6$, 240 grams silica sand, and 800 grams of concentrated $H_2SO_4$ were brought together in a still at a temperature of 150° C. The $SiF_4$ evolved was led into a solution of 20% aqueous HF, cooled with tap water while HF was also led into the solution in such quantity that neither free HF nor free $SiO_2$ could be titrated. A slight excess of concentrated $NH_4OH$ was added and the precipitate of silica composition separated from the solution. On analysis, the calcined silica showed less than .003% of nonvolatile impurities (mainly Mg and Fe, spectroscopically identified).

Example II

Same as Example I except that the precipitate was heated to 500° C. for two hours.

Example III

Example I was varied by the addition to the reaction mixture just before the final precipitation of 0.3 gram of $As_2O_3$ in water solution for each 1000 grams of $SiO_2$ produced.

The quantity of arsenic to be employed for best results appears to be related to the silicon content of the final zinc silicate composition and it is convenient although not necessary to incorporate the proper amount of arsenic in the silica after which standard practice may be followed in the production of the luminescent silicates, using the special arsenic-containing silica where silica of usual derivation has been used heretofore.

The proportion range for arsenic, for best results, should be of the order of 0.003% to 0.03% of the $SiO_2$ content, arsenic being for the calculation treated as elemental, and $SiO_2$ being treated as such even though probably being entirely in combined form in the final product. Fair results may be had outside this range, for example in the range .001% to .05%, arsenic based upon $SiO_2$ as before. This material exhibits the property of being excitable by sunlight. The activator, preferably $Mn(NO_3)_2$ or $MnCl_2$, may be employed in usual concentrations such as from 3 to 10 per cent of the $SiO_2$. Proportions of other constituents may vary as indicated in the examples following. If instead of calculating the arsenic content as parts of elemental arsenic per 100 parts $SiO_2$, which gives a preferred range of 0.003% to 0.03%, the arsenic content is calculated as parts of $As_2O_3$ per 100 parts $SiO_2$, the result will be for the same preferred range approximately 0.004% to 0.04%. Again, if the calculation, in the case of a zinc silicate is based upon parts of $As_2O_3$ per 100 parts zinc silicate, the same preferred range will be expressed as 0.001% to 0.01%.

Example IV

I may, for example, grind 60 parts by weight (dry basis) of silica containing from .003% to .03% arsenic, either dried at a temperature of the order of 500° C. or preferably uncalcined, with from 190 to 380 parts of $Zn(NO_3)_2$ and from 2.5 to 5 parts of $Mn(NO_3)_2$ and sufficient water to produce a thin slurry. If the silica composition is used as a wet cake such as obtained after filtering, it will yield pure silica upon subsequent calcination since it was produced from raw materials which contained no non-volatile impurities. The thin slurry may be evaporated to dryness, fired to about 600° C. to expel all water vapor and nitric gases, reground in a ball mill and again fired, preferably at 800° to 900° C. until all volatile fluorides are expelled and then fired to about 1200° C. for one-half hour or longer. The resulting zinc silicate composition shows strong green fluorescence after suitable excitation and a surprisingly brilliant afterglow.

Example V

Cadmium silicate 345 grams cadmium oxide, 76.2 grams magnesium nitrate (hexahydrate) crystals, 255 grams silica (dry basis) in form of a wet cake, 22.5 grams manganese nitrate (calculated as anhydrous), 60 mg. of $As_2O_3$ in solution and sufficient water to form a fairly thick slurry are ball milled together. The slurry is evaporated to dryness, calcined at 600-700° C. until volatile matter is expelled and reground dry after cooling. The powder is then calcined at about 1075° C. for one hour. After cooling it shows strong pink fluorescence with a strong afterglow.

Example VI

Zinc beryllium silicate 324 grams zinc oxide, 100 grams beryllium oxide, 276 grams silica (dry basis) in form of a wet filter cake, 19.6 grams manganese chloride, 30 mg. of $As_2O_3$ in aqueous solution and sufficient water to form a slurry are ball milled together until homogeneous. Drying, etc. is carried out as in Example V. The final calcination temperature may be 1100° to 1300° C. (preferably 1220° C.).

EXAMPLE VII

Zinc beryllium magnesium silicate 324 grams zinc oxide, 60 grams beryllium oxide, 64 grams magnesium oxide, 280 grams silica (dry basis) as a wet cake, 73 grams manganese chloride crystals, 25 mg. of $As_2O_3$ in aqueous solution and sufficient water to form a slurry are treated as before and finally calcined at about 1090° C. (Limits: 1000°–1150° C.)

Having thus described my invention, what I claim is:

1. A luminescent silicate material having incorporated therein a quantity of an oxide of arsenic sufficient to produce a content of from .001% to .05% of arsenic based upon the weight of $SiO_2$, whereby to impart to said material an improved afterglow.

2. A luminescent silicate material having incorporated therein from .001% to .05% of arsenic based upon the weight of $SiO_2$.

3. A luminescent silicate material having incorporated therein from .003% to .03% of arsenic based upon the weight of $SiO_2$.

4. A manganese activated, luminescent zinc-beryllium silicate having incorporated therein from .001% to .05% arsenic based upon the weight of $SiO_2$.

5. A manganese activated, luminescent cadmium silicate having incorporated therein from .001% to .05% of arsenic based upon the weight of $SiO_2$.

6. A manganese activated, luminescent zinc-beryllium silicate having incorporated therein from .003% to .03% arsenic based upon the weight of $SiO_2$.

7. A manganese activated, luminescent cadmium silicate having incorporated therein from .003% to .03% of arsenic based upon the weight of $SiO_2$.

8. A new composition of matter comprising a luminescent silicate being the product of a process comprising precipitating silica in a non-colloidal state from a solution of a substance of the group consisting of ammonium silicofluoride and fluosilicic acid, all reactants being substantially free from non-volatile impurities, and calcining the resulting silica with a sutable activating agent and a compound capable of combining therewith to form a luminescent silicate composition.

9. As a new composition of matter, a luminescent zinc silicate composition, being the product of a process comprising precipitating silica in a non-colloidal state from a solution of a substance of the group consisting of ammonium silicofluoride and fluosilicic acid, all reactants being substantially free from non-volatile impurities, and calcining the resulting silica with a suitable activating agent and a zinc compound capable of combining therewith to form a luminescent zinc silicate composition.

10. Process of making a silica composition suitable for production of a luminescent material comprising coprecipitating from a solution substantially free from non-volatile impurities a composition containing oxides of silica and arsenic, the latter amounting to from .004% to .04% of the former.

11. A silica composition, suitable for production of a luminescent material, comprising highly pure silica containing from .004% to .04% of oxide of arsenic.

12. A luminescent zinc silicate composition of high purity, the same containing from .004% to .04% of oxide of arsenic, calculated on the $SiO_2$ content and being excitable by sunlight.

13. A luminescent zinc silicate composition containing from .001% to .01% oxide of arsenic, the percentage of arsenic being calculated on the basis of the weight of the zinc silicate.

14. A manganese activated zinc silicate composition containing from .001% to .01% oxide of arsenic, the percentage of arsenic being calculated on the basis of the weight of the zinc silicate.

15. A process of producing a luminescent zinc silicate composition comprising intimately admixing 60 parts by weight of highly purified, finely divided silica in a physical state to appear opaque when dispersed in quinoline, 190 to 380 parts of $Zn(NO_3)_2$ and a small quantity of an activating manganese compound, firing at a temperature of the order of from 800 to 900° C. until the evolution of volatile material has substantially ceased and then firing to a temperature of the order of 1200° C.

16. A process of producing a luminescent zinc silicate comprising precipitating from aqueous solution a silica, containing $NH_4F$ as an impurity, and, in such physical state that if a sample is dispersed in quinoline it will appear opaque, admixing the same, uncalcined, with a zinc compound and an activating material in proportions suitable for forming luminescent zinc silicate and calcining the resulting mixture.

HERMAN C. FROELICH.